Aug. 15, 1944.   L. B. MacGREGOR   2,355,666
TRANSMISSION GEARING
Original Filed July 25, 1941
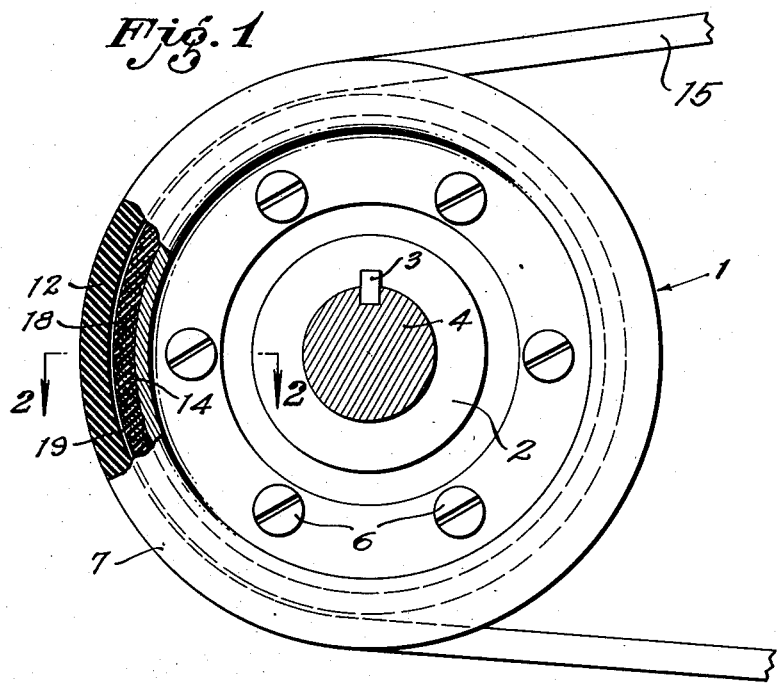
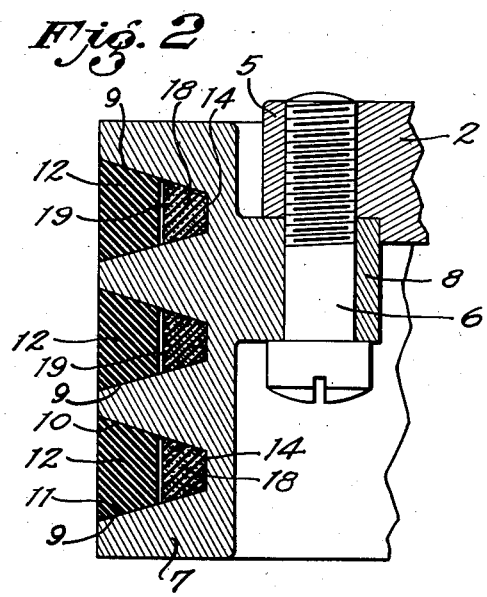
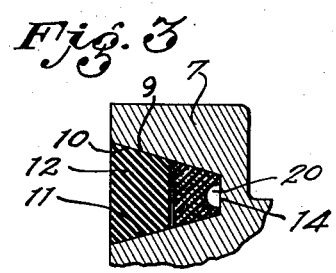
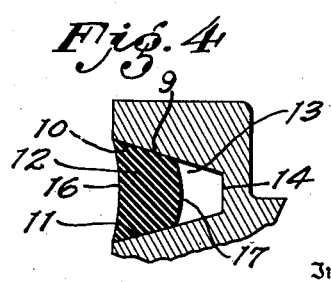
Inventor,
LAURENCE B. MacGREGOR
By
Attorney Patented Aug. 15, 1944

2,355,666

UNITED STATES PATENT OFFICE 2,355,666

TRANSMISSION GEARING

Laurence B. MacGregor, Long Beach, Calif., assignor, by direct and mesne assignments, to L & M Rubber Products, Inc., Long Beach, Calif., a corporation of California Continuation of application Serial No. 403,977, July 25, 1941. This application October 13, 1943, Serial No. 506,114

2 Claims. (Cl. 74—230.7)

This invention relates to improvements in transmission gearing and particularly to the type comprising a pulley having one or more parallel circumferential wedge-shaped grooves to receive one or more wedge-shaped belts.

This application is a continuation of my co-pending application for "Transmission gearing," Serial No. 403,977, filed July 25, 1941.

It is common practice to utilize a belting which is substantially wedge-shaped in cross section, the said belting being formed of rubber impregnated fabric webbing in built-up layers. Such belting is very expensive.

Experience has shown that where belting passed over pulleys is utilized for driving different shaft members from a line shaft, any variation in the torque of the line shaft causes the belting to whip. This whipping action gradually breaks down the impregnated fabric structure with the result that the fibres of the belting start to separate. This separation is caused when the belting tends to assume a transverse curve due to variation in power load, and such tendency of the belting to transversely curve breaks the fibres.

An object of the present invention is to so construct the pulley over which the belting passes that regardless of variation in applied load any whipping in the belting will not appreciably affect the same to cause the fibres to separate or break, with the result that a belting is assured of long life.

A small belting costs in the neighborhood of $40.00 to $60.00, so it may be readily seen that if the life of the belting can be preserved that an appreciable financial saving results.

Other objects include a pulley construction which is simple, inexpensive in cost of manufacture, and superior.

With the above mentioned and other objects in view, the invention consists in the novel and useful provision, formation, construction, association, and relative arrangement of parts, members and features, all as shown in a certain embodiment in the accompanying drawing, described generally, and more particularly pointed out in the claims.

In the drawing:

Figure 1 is a fragmentary side elevation, a certain portion being in section, illustrating one form of my invention, Figure 2 is an enlarged sectional view on the line 2—2 of Figure 1, Figure 3 is a fragmentary transverse sectional view of a slightly modified form of the invention, and Figure 4 is a sectional view illustrative of action that occurs when the belting whips in the ordinary form of pulley.

In accordance with an illustrative embodiment of this invention, a pulley is provided with one or more wedge-shaped belt grooves; a normally wedge-shaped belt is designed to engage such a groove, with the side walls of the belt in driving contact with the side walls of the groove, the belt being of sufficient depth to be normally non-flexing transversely when its inner face is appreciably spaced from the bottom of the groove; and a fillet formed of the material more resilient than the belt is mounted in the bottom of the groove, the fillet being designed so that its outer face is slightly spaced radially from the inner face of the belt to be normally out of driving contact therewith.

Referring now to the drawing, the improved pulley is designated as an entirety by the numeral 1. It is usual practice to provide a pulley having a hub member 2 adapted to be keyed as at 3 to a shaft 4 for the purpose of driving the hub, and said hub in turn is provided with an annular flange 5 adapted to be detachably secured by screws or the like 6 to an annular rim 7. This rim is formed with an annular flange 8, and the means 6 is passed through aligned openings in the flanges 5 and 8. The rim 7 is formed with one or more, and, usually a plurality of circumferential grooves 9. These grooves are usually wedge-shaped, that is to say, provided with side walls 10 and 11 inclined divergently outwardly. The belting 12, adapted or designed to run in the groove 9, corresponds in shape to the groove and there is usually a space between the base 13 of the belting and the bottom wall 14 of the groove. Thus, as the belting rolls along the side walls bounding the groove, it gradually moves within the groove to maintain a tight frictional grip on the side walls. The belt is of sufficient depth to be normally non-flexing transversely when its inner face is appreciably spaced from the bottom of the groove. However, due to variations in power load, the top course 15 of the belting, which is usually in tension, relaxes, and upon a reassumption of the power load, a snapping or whipping action in the course 15 occurs. The belting has a tendency to transversely curve, as shown at 16 and 17 in Figure 4. As the belting is relatively stiff, being made up of rubber impregnated layers of fabric and cords, this transverse curving tends to break the rubber impregnations and ofttimes the cords, and cause separation of various layers of the belting. When this occurs, the belting must be replaced, as it is liable to sudden breakage with sometimes disastrous results to both workmen and to machinery.

I have found that by placing within the groove 9 an inset or fillet of rubber or rubber composition 18, said inset having its circumferential face 19 spaced a slight distance from the bottom face of the belting during normal use of said belting, that the tendency to curve as shown in Figure 4 is effectively done away with as the belting will contact with the circumferential face 19 and thus transverse bending or curving is prevented. Furthermore, as a belt wears along its side walls, the bottom face of the belt is brought into contact with the circumferential face 19 of the inset or fillet 18 and as this inset or fillet is of softer composition than the belt, or more resilient, wear may occur on said circumferential face so that the fillet is worn as the belting is worn along the sides. Thus, when the belting is worn out and no longer of any use, the fillet has been correspondingly worn.

In certain adaptations of the invention, I have found it expedient to provide what may be termed an air cell 20 for the fillet. This air cell is formed by providing an annular groove in the base of the fillet. Thus, pressure applied to the circumferential face of the fillet tends to spread the air cell and provides an added resiliency for the fillet, in that the fillet immediately reassumes its normal cross sectional form when pressure is relieved from the circumference thereof.

I do not specify rubber or composition of any particular hardness, although I have found a hardness of 65 to be satisfactory.

I claim:

1. Transmission gearing, comprising, a pulley provided with a wedge-shaped belt groove, a normally wedge-shaped belt designed to engage said groove, with side walls of said belt in driving contact with the walls of the groove, said belt being of sufficient depth to be normally non-flexing transversely when its inner face is appreciably spaced from the bottom of the groove, and a fillet formed of a material more resilient than the belt and mounted in the bottom of the groove, said fillet being designed so that its outer face is slightly spaced radially from the inner face of the belt to be normally out of contact therewith.

2. Transmission gearing, comprising, a pulley provided with a wedge-shaped belt groove, a normally wedge-shaped belt designed to engage said groove, with side walls of said belt in driving contact with the walls of the groove, said belt being of sufficient depth to be normally non-flexing transversely when its inner face is appreciably spaced from the bottom of the groove, and a fillet formed of a material more resilient than the belt and mounted in the bottom of the groove, said fillet being designed so that its outer face is slightly spaced radially from the inner face of the belt to be normally out of contact therewith, the portion of the fillet engaging the bottom of the groove having an air cell.

LAURENCE B. MacGREGOR.